United States Patent
Merrill et al.

(10) Patent No.: US 9,436,621 B1
(45) Date of Patent: Sep. 6, 2016

(54) LAYERED DEVICE DRIVER

(71) Applicant: EMC Corporation, Hopkinton, MA (US)

(72) Inventors: Marshall L. Merrill, Durham, NC (US); Tim C. Mantooth, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 16 days.

(21) Appl. No.: 13/799,197

(22) Filed: Mar. 13, 2013

(51) Int. Cl.
G06F 3/00 (2006.01)
G06F 9/44 (2006.01)
G06F 9/46 (2006.01)
G06F 13/00 (2006.01)
G06F 13/10 (2006.01)

(52) U.S. Cl.
CPC .................................. G06F 13/102 (2013.01)

(58) Field of Classification Search
None
See application file for complete search history.

(56) References Cited

U.S. PATENT DOCUMENTS

| | | | |
|---|---|---|---|
| 5,987,565 A | 11/1999 | Gavaskar | |
| 7,181,486 B1* | 2/2007 | Lum | 709/200 |
| 7,702,762 B1* | 4/2010 | Jagana | 709/223 |
| 2006/0174251 A1 | 8/2006 | Pope et al. | |
| 2008/0229044 A1* | 9/2008 | Krig | 711/169 |
| 2009/0077572 A1* | 3/2009 | Andjelic | 719/321 |
| 2009/0172707 A1 | 7/2009 | Huang et al. | |
| 2012/0131375 A1 | 5/2012 | Adda et al. | |
| 2012/0311175 A1* | 12/2012 | Zhang et al. | 709/231 |
| 2013/0007403 A1* | 1/2013 | Malcolm | G06F 11/008 711/171 |
| 2013/0054821 A1 | 2/2013 | Ben-Amos et al. | |

* cited by examiner

*Primary Examiner* — H S Sough
*Assistant Examiner* — William C Wood
(74) *Attorney, Agent, or Firm* — Staniford Tomita LLP

(57) ABSTRACT

A layered device driver operating on a computer system is discussed. The device driver includes three components: an application component operating in user space, an interface component operating in kernel space, and a physical component operating in kernel space.

14 Claims, 4 Drawing Sheets

LAYERED DEVICE DRIVER

CROSS REFERENCE TO RELATED APPLICATIONS

This application is related to co-pending U.S. patent application Ser. No. 13/799,339 for MANIPULATING HARDWARE USING A LAYERED DEVICE DRIVER and co-pending U.S. patent application Ser. No. 13/799,662 for CONTROLLING A LAYER DRIVER filed concurrently herewith, which are incorporated herein by reference for all purposes.

FIELD OF THE INVENTION

This invention relates generally to device drivers, and more particularly to systems and methods for dividing a device driver between user space and kernel space.

BACKGROUND OF THE INVENTION

Device drivers are software programs designed to control and manipulate hardware devices. In virtual environments, such as virtual machines, device drivers may control or manipulate virtual devices, such as a virtual hard drive or network card.

Drivers are commonly implemented solely in kernel space, which is the region of memory reserved for the kernel and its processes. In contrast, user applications typically operate in user space.

There is a need, therefore, for an improved method, article of manufacture, and apparatus for developing, maintaining, and operating device drivers.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
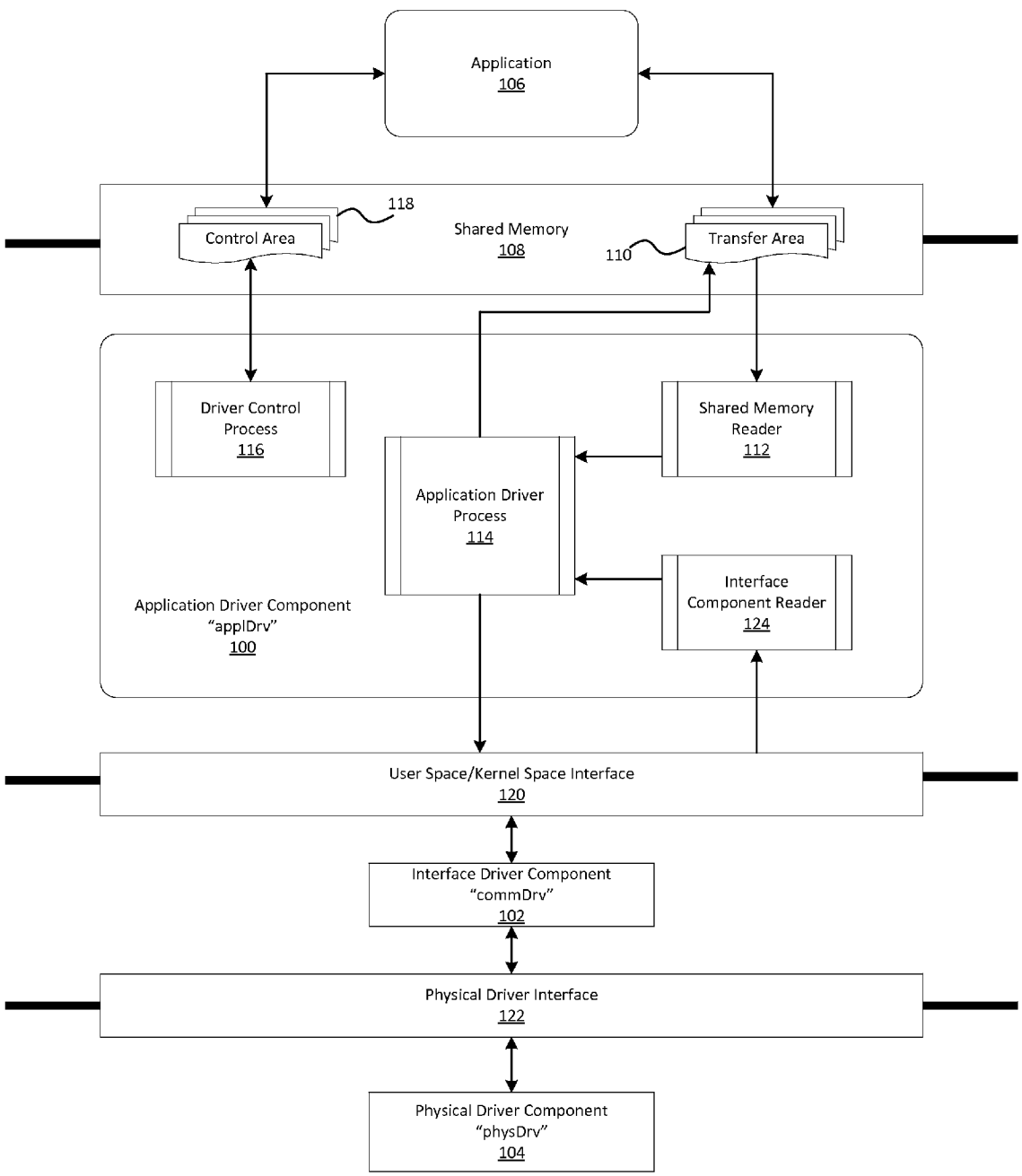
FIG. 1 illustrates a driver architecture for splitting a device driver between user space and kernel space.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Drivers are commonly implemented in kernel space. As a result, bugs in the driver may affect the entire system. If the driver crashes, there is a chance the entire environment may crash. Additionally, debugging drivers in kernel space is challenging. Debugging tools and techniques operating in user space may not have visibility into the driver's operation, and therefore bugs may be difficult to locate and resolve. As a result, a developer writing a driver may need to use specialized kernel debuggers rather than common debugging tools, such as gdb. This may result in significant time, cost, and stress.

Additionally, unique drivers need to be written for unique pieces of hardware, even if the hardware functionality is very similar. This can result in the added expense of developing and debugging individual drivers, even when the driver functionality is substantially the same.

The present disclosure discusses a layered device driver which operates in both user and kernel space. The driver may be divided into the following three components: an application component operating in user space, an interface component operating in kernel space, and a physical component operating in kernel space. The application component may implement high-level functions and may interface with a user application through a shared memory space. Placing the high-level functions in user space may allow a developer to use common debugging tools to identify issues with the driver. Additionally, if the application component crashes the driver may fail without compromising the rest of the system. The application component may make calls to the interface component operating in kernel space, which thereafter transmits the calls to the physical component with little or no data content manipulation. In an embodiment, the physical component and the application component together may implement Fiber Connection ("FICON") protocol.

Throughout this discussion, reference will be made to I/O operations such as read and write. These references are made for ease of illustration, and it should be noted that the layered driver discussed herein may be used with any hardware device, physical or virtual, to perform any function. For example, the driver may be used to eject a CD from a disk drive just as it may be used to read from or write to a disk drive.

Turning now to FIG. 1, a layered device driver architecture is discussed. The device driver may be divided into three primary components: application driver component ("applDrv") 100, interface driver component 102 ("commDrv"), and physical driver component ("physDrv") 104. Application driver component 100 may operate in user space, while commDrv 102 and physDrv 104 may operate in kernel space. In an embodiment, application driver component 100 may control the driver's high-level functionality, commDrv 102 may serve as an interface between applDrv and physDrv, and physDrv may interact with and/or manipulate a hardware device.

Application driver component 100 may interface with user application 106 through shared memory space 108. In an embodiment, this memory space may be on physical primary memory, such as random access memory ("RAM"). Application 106 may read and write instructions or data to the shared memory space using transfer area 110. This information may then be read from the shared memory using shared memory reader 112, and transferred to application driver process 114 for additional processing.

In some embodiments, transfer area 110 may comprise one or more data buffers for transferring data between application 106 and applDrv 100. These buffers may be managed by buffer pools, and in one embodiment are managed by three buffer pools. A application buffer pool may manage buffers for notifications or responses flowing to application 106, a first data buffer pool may manage buffers for data flowing to application 106, and a second data buffer pool may manage buffers for data flowing from application 106. Each of these buffer pools may be managed by a shared memory semaphore coordinating the information flow between application 106 and applDrv 100.

For example, data flowing to application 106 may include a response packet on a buffer from the application buffer pool. The response packet may contain a union of several different packet types identifying any response data. This packet may also include a list of data buffers from the first data buffer pool, where those data buffers contain data for application 106. For example, application 106 may have previously submitted a read request, and the buffers from the data buffer pool may include the information that was actually read. In some embodiments, the data buffers may comprise FICON Information Units ("IU"), and the IU's may have a max size of 8K.

In an embodiment, data flowing to application 106 may be managed using a semaphore. When application 106 makes a data request, it may set a semaphore to await a response. The semaphore may indicate when the data is available, and user application 106 may thereafter read the data out of the shared memory. In some embodiments, application 106 may have multiple logical connections to the layered driver through shared memory 108. In such an embodiment, each connection may set its own semaphore to control data flow to application 106.

Buffers may also be used to control data flowing from application 106 to applDrv 100. Application 106 may write information to a buffer from the second data buffer pool in shared memory 108. This information may include, for example, a request packet and accompanying data. The request could be a "write" request and the data may comprise the data to be written. After writing the information to the buffer, a semaphore may be set to wait for a response. Application driver component 100 may then use shared memory reader 112 to read the information and queue it for processing by application driver process 114. Application driver process 114 may receive and process the information, set any necessary return data, and set the semaphore to indicate the response is complete.

Application driver process 114 may implement high-level functionality traditionally performed in the kernel, and in an embodiment may implement FICON protocol with physDrv 104. Moving this functionality into user space may allow a developer to easily debug the driver using common debugging tools, such as gdb. Additionally or alternatively, since application driver process 114 operates in user space, if the process crashes it may fail without compromising the system as a whole.

After processing the request from application 106, application driver process 114 may call commDrv 102 through user space/kernel space interface 120. In some embodiments, this interface may be an ioctl( ) interface on a Unix® based system. For example, application driver process 114 may call commDrv 102 using the ioctl( ) function. Similarly, on a Windows® system the DeviceIOControl function may be called to interface application driver process 114 with commDrv 102.

After receiving data from application driver process 114, commDrv 102 may pass it through physical driver interface 122 to physDrv 104 with little or no content processing. In an embodiment, physical driver interface 122 may be an API allowing various calls to be made to physDrv 104. Additionally or alternatively, commDrv may interface with physDrv using function pointers.

In some embodiments, commDrv 102 may include buffer management and utility functions needed by physDrv 104. Placing these functions in commDrv 102 may allow commDrv and applDrv 100 to be used with various types of hardware components, without writing an entirely new driver for each component. In such an embodiment, unique physDrv's may be written for each hardware device, but they may all use the same commDrv and applDrv. As a result, development time may be reduced and software consistency may be increased.

After physDrv 104 has manipulated a hardware device, it may return a response to commDrv 102. For example, if application 106 submitted a read request, physDrv 104 may return the read data to commDrv 102. This response may be read from commDrv 102 using interface component reader 124, and thereafter processed by application driver process 114. Application driver process 114 may then write the response to transfer area 110 in shared memory 108, and the response may be retrieved by application 106. In an embodiment, the data may be transferred between application driver process 114 and application 106 using data buffers, as described above.

Application 106 may also interface with driver control process 116 through shared memory 108. Driver control process 116 could be used, for example, to initiate processes within application driver process 114, identify device ports, and/or map these device ports into shared memory 108. In an embodiment, control area 118 interfaces control process 116 with application 106. Control process 116 and control area 118 are discussed in detail below with reference to FIG. 4.

Figure 2:
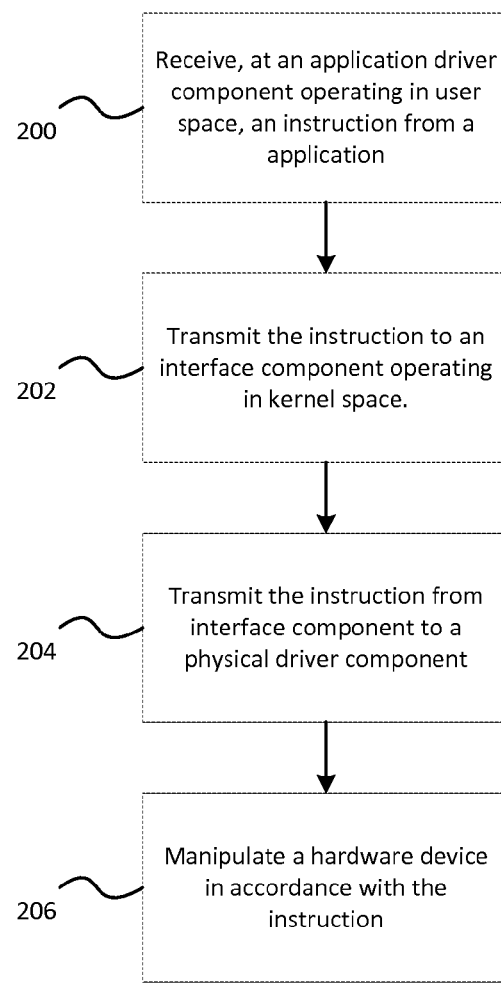
FIG. 2 is a high level flowchart illustrating data flow through a layered device driver.

Turning now to FIG. 2, a high-level flowchart demonstrating device manipulation on an architecture similar to FIG. 1 is discussed. At 200, an instruction may be received at a layered device driver's application driver component operating in user space. In an embodiment, this application driver component may be substantially similar to applDrv 100. The instruction may come, for example, from a user application such as application 106. At 202, the instruction may be transmitted to an interface component. This interface component could be, for example, commDrv 102. At 204 the instruction may be transmitted from the interface component to a physical driver component, such as physDrv 104, and at 206 a hardware device may be manipulated in accordance with the instruction.

Figure 3:
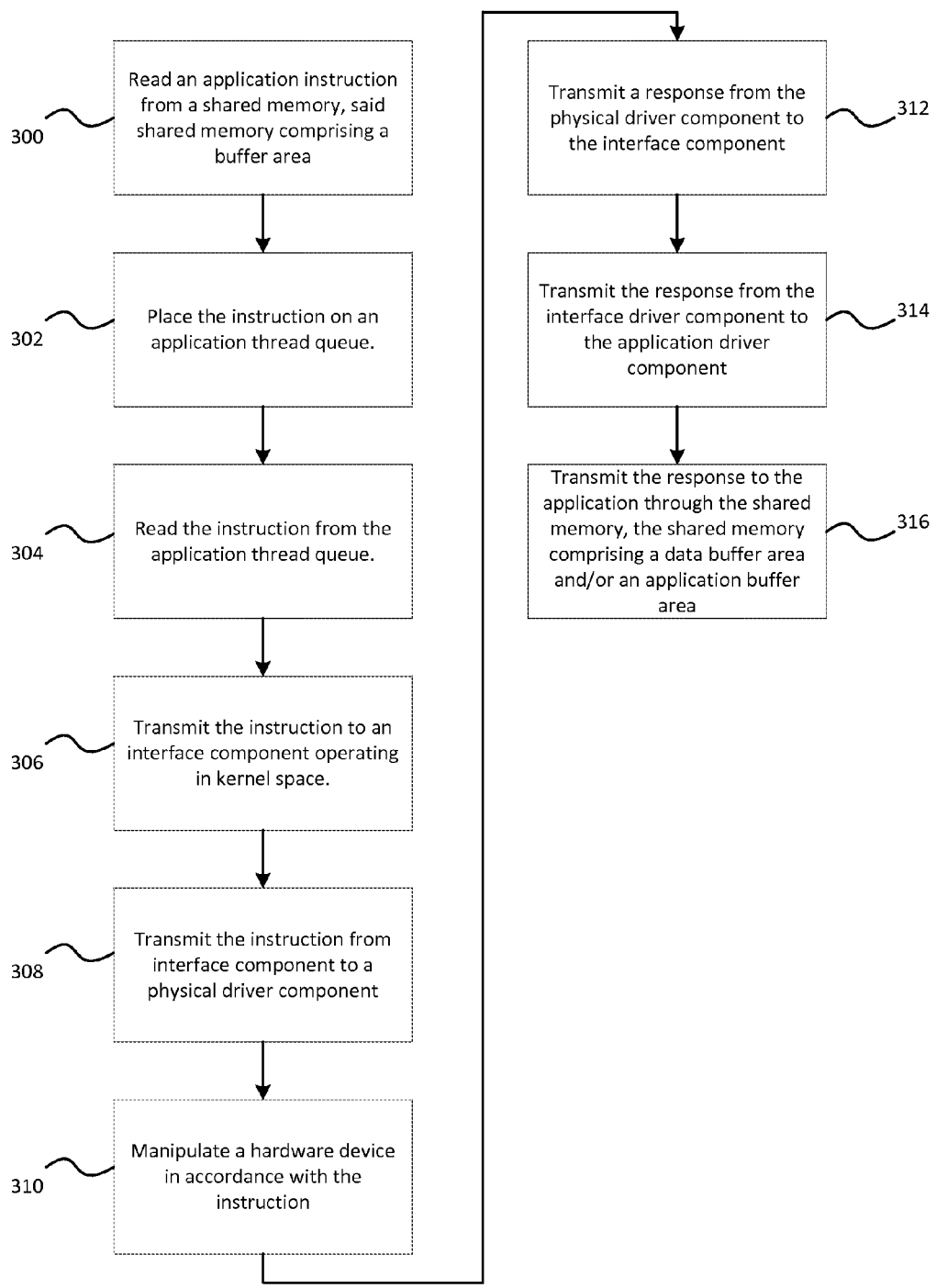
FIG. 3 is a detailed flowchart illustrating data flow and manipulation using a layered device driver.

With reference to FIG. 3, a detailed flowchart demonstrating device manipulation using a layered device driver is discussed. At 300, an instruction is read from a shared memory space. This instruction could be read, for example, by shared memory reader 112 operating in applDrv 100. The instruction may have been placed in transfer area 110 by application 106 prior to being read. In some embodiments, the instruction is read from a buffer area inside shared memory 108. This buffer area may be substantially similar to the buffer areas described above.

At 302, shared memory reader may place the instruction on an application thread queue for an application driver process, such as application driver process 114. The thread queue may be used to manage instructions flowing to the application driver process, and in an embodiment may feed them to the process one-at-a-time as requested by the process. When the application driver process is available to process the instruction, the instruction may be retrieved from the queue at block 304.

After retrieving the instruction, the application driver process may perform high level processing traditionally performed in the kernel space. For example, the application driver process along with a physical driver component may be used to implement FICON protocol.

At 306, the application driver process may transmit the instruction to a driver component operating in kernel space, such as commDrv 102. In an embodiment, this transmission may be through an interface such as user space/kernel space interface 120. In an embodiment, the transmission may be made using an ioctl( ) command. Additionally or alternatively, a second shared memory space may be used. This second shared memory space may be similar to shared memory 108, but may reside between user space/kernel space rather than between a user application and a driver application.

At 308, the instruction is transmitted from the interface component to the physical driver component. For example, the instruction may be transferred from commDrv 102 to physDrv 104. This transmission may be through a physical driver interface, such as interface 122, and in an embodiment may comprise passing function pointers.

At block 310, a hardware device may be manipulated in accordance with the instruction. This manipulation may be performed by a physical driver component, such as physDrv 104. For example, if the hardware device is a hard drive and the instruction is "read data," the arm, head, and disk of the drive may be manipulated to read the requested data. Similarly, the hardware device may be a network card and the instruction may be to write data to a specific port.

At 312, a response may be transmitted from the physical driver component to the interface driver component. For example, if the original instruction was a read request the physical driver component may transmit the read data to the interface driver component.

At 314, the response is transmitted from the interface driver component to the application driver component. In an embodiment, the response may be read from the interface driver component using a read process, such as interface component reader 124. This read process may then queue the response for processing by application driver process 114. When the application driver process is available, it may retrieve the response from the queue for high-level processing.

At 316, the response is transferred from the application driver process to the application through a shared memory space. For example, application driver process may retrieve a free buffer from the shared memory space, such as a buffer from the first data buffer pool discussed above, and link the response and any accompanying data to the buffer. The process may thereafter set a semaphore indicating data is available to the user application. The user application may then read the data into its own memory and release the buffer back into the shared memory for future use.

Figure 4:
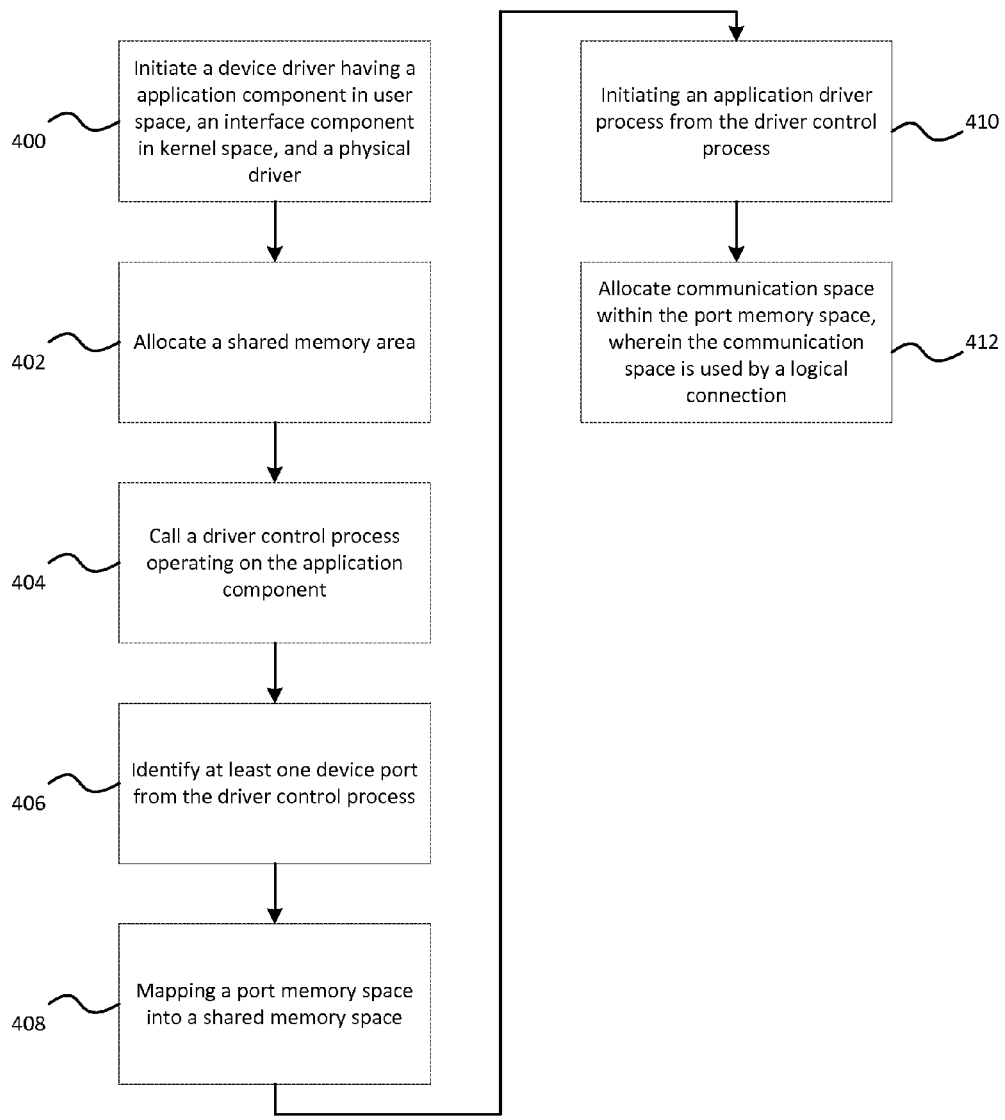
FIG. 4 is a flowchart illustrating initialization and control of a layered device driver.

Turning now to FIG. 4, a process for initializing and controlling a layered device driver is discussed. Before an application can use the layered device driver to manipulate a hardware device, the driver must be initialized. This process includes identifying specific device ports, which may be physical ports or, in the case of a virtual environment, virtual ports. For example, a port may be a device that physically receives a network cable. In a virtual environment, a port may be the virtual representation of a device which would physically receive a network cable. Similarly, before an application can interact with a port it must make a connection. Connections are logical constructions, such as a FICON or Ethernet connection to a remote port.

At block 400, the layered device driver may be initialized. The device driver may be substantially similar to the driver shown in FIG. 1, and may include an application component operating in user space, and interface component operating in kernel space, and a physical component operating in kernel space. These components could be, for example, applDrv 100, commDrv 102, and physDrv 104. In an embodiment, these components are initialized sequentially. The interface driver component may be first, followed by the physDrv, and finally the applDrv.

At 402, the process may allocate a shared memory space to interface the layered driver and an application, such as application 106. In an embodiment, this shared memory space may be substantially similar to shared memory 108.

After the driver is initialized and the shared memory space allocated, at 404 a call may be made from a user application to a driver control process operating inside applDrv 100. In an embodiment, driver control process may be driver control process 116, and the call may be made through memory 108. Driver control process 116 may be a master process for controlling driver operation. Driver control process 116 may monitor shared memory 108 for calls from user applications, maintain shared memory areas for ports and connections, and initialize application driver processes.

At 406, the driver control process may identify physical device ports, and at 408 a memory space for each of these ports may be mapped into shared memory 108. In an embodiment, each port has its own memory space in the shared memory for managing connections and data transfer. Additionally or alternatively, each port may have its own control space in memory such that there is one control area 118 per port. This control space may be used by the driver control process to manage application driver processes, such as application driver processes 114.

At block 410, communication space is allocated within a port's shared memory space. This communication space may be allocated as the result of a request from the application to establish a connection through the port. In an embodiment, the communication space may be transfer area 110, and there may therefore be one transfer area 110 per connection per port. For example, in a system with two ports there may be two shared port memory spaces. If an application requests one connection through the first port and two connections through the second port, there may be a total of three transfer areas 110. One transfer area may be in the shared memory space for the first port, and two transfer areas may be in the shared memory space for the second port.

Finally, at block 412, an application driver process is initialized from the driver control processes. This application driver process may be substantially similar to application driver process 114, and may be initialized at the request of the user application. For example, when an application requests a connection through a given port, the control process may allocate memory space for that connection in the port's shared memory space, and thereafter initiate an application driver process 114 for that connection. As a result, in some embodiments there is one application driver process per logical connection.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A layered device driver operating in both user and kernel space, and a hardware device comprising:
   an application driver component operating in user space, wherein the application driver component is enabled to implement high-level functionality in user space instead of in kernel space, and is configured to isolate failure of the application driver component from layered device driver components operating in kernel space;
   one or more standard, non-proprietary debugging tools residing in the user space and configured to facilitate easy debugging of the layered device driver;
   a first shared memory interfacing the application component with an application, the first shared memory including an application buffer pool comprising notification buffers, the first shared memory including at least one data buffer pool comprising data buffers;
   a physical driver component operating in kernel space and in communication with the hardware device;
   a second shared memory residing between user space and kernel space and configured to queue an instruction to the physical driver component; and
   an interface driver component operating in kernel space, wherein the interface component is in communication with the application driver component and the physical driver component.

2. The device driver of claim 1, wherein the interface driver component transmits data between the application driver component and the physical driver component, and wherein the debugging tools have visibility into the physical driver component operation residing in the kernel space.

3. The device driver of claim 2 wherein the at least one data buffer pool is managed by a first shared memory semaphore coordinating information between the application and the physical driver component.

4. The device driver of claim 3 wherein the semaphore indicates when data is ready when the application makes a data read request so that the application can read data out of the first shared memory, and indicates when data is ready when the application makes a data write request so that the physical driver component can read data out of the first shared memory.

5. The device driver of claim 1, wherein the application driver component and the physical driver component implement a connection protocol, wherein the connection protocol comprises a fiber connection protocol utilizing information unit data buffers containing data for the application.

6. The device driver of claim 1 wherein the physical driver component is initialized by identifying device ports comprising physical or virtual ports, establishing a connection between the device ports and the application, and allocating the first shared memory space to interface the application to the physical driver component.

7. The device driver of claim 1 further comprising a driver control component identifying physical device ports and mapping memory space for each port into one of the first shared memory or second shared memory such that there is one control area per port, wherein the control space is used by the driver control component to manage the application driver component.

8. A hardware device and a computer program product comprising a non-transitory computer usable medium having machine readable code embodied therein for establishing a layered device driver operating in both user and kernel space, the hardware device comprising:
   an application driver component operating in user space, wherein the application driver component is enabled to implement high-level functionality in user space instead of in kernel space, and is configured to isolate failure of the application driver component from layered device driver components operating in kernel space;
   one or more standard, non-proprietary debugging tools residing in the user space and configured to facilitate easy debugging of the layered device driver;
   a first shared memory interfacing the application component with an application, the first shared memory including an application buffer pool comprising notification buffers, the first shared memory including at least one data buffer pool comprising data buffers;

a physical driver component operating in kernel space and in communication with the hardware device;

a second shared memory residing between user space and kernel space and configured to queue an instruction to the physical driver component; and an interface driver component operating in kernel space, wherein the interface component is in communication with the application driver component and the physical driver component.

9. The device driver of claim 8, wherein the interface driver component transmits data between the application driver component and the physical driver component, and wherein the debugging tools have visibility into the physical driver component operation residing in the kernel space.

10. The device driver of claim 9 wherein the at least one data buffer pool is managed by a first shared memory semaphore coordinating information between the application and the physical driver component.

11. The device driver of claim 10 wherein the semaphore indicates when data is ready when the application makes a data read request so that the application can read data out of the first shared memory, and indicates when data is ready when the application makes a data write request so that the physical driver component can read data out of the first shared memory.

12. The device driver of claim 8, wherein the application driver component and the physical driver component implement a connection protocol, wherein the connection protocol comprises a fiber connection protocol utilizing information unit data buffers containing data for the application.

13. The device driver of claim 8 wherein the physical driver component is initialized by identifying device ports comprising physical or virtual ports, establishing a connection between the device ports and the application, and allocating the first shared memory space to interface the application to the physical driver component.

14. The device driver of claim 8 further comprising a driver control component identifying physical device ports and mapping memory space for each port into one of the first shared memory or second shared memory such that there is one control area per port, wherein the control space is used by the driver control component to manage the application driver component.

* * * * *